United States Patent [19]

Forney, Jr.

[11] 3,723,911

[45] Mar. 27, 1973

[54] TRAINING ADAPTIVE LINEAR FILTERS

[75] Inventor: George D. Forney, Jr., Lexington, Mass.

[73] Assignee: Codex Corporation, Newton, Mass.

[22] Filed: Sept. 13, 1971

[21] Appl. No.: 179,653

[52] U.S. Cl. ....................333/18, 328/167, 333/70 T

[51] Int. Cl. ..............................................H04b 3/04

[58] Field of Search .325/42, 65; 333/18, 28 R, 70 T; 328/167

[56] References Cited

UNITED STATES PATENTS

| | | | |
|---|---|---|---|
| 3,283,063 | 11/1966 | Kawashima et al. | 333/18 UX |
| 3,375,473 | 3/1968 | Lucky | 333/18 |

*Primary Examiner*—Paul L. Gensler
*Attorney*—John Noel Williams

[57] ABSTRACT

Adaptive linear transversal filter is trained with a periodic training sequence having period exactly equal to the number of variable parameters of the filter to be set in the training mode. After training, tap coefficients may be cycled in a closed loop to a preferred position.

5 Claims, 2 Drawing Figures

TRAINING ADAPTIVE LINEAR FILTERS

This invention relates to adaptive linear transversal filters; for example, such as are commonly used as equalizers in high-speed data communications equipment. Such filters have a number of variable parameters which can be adjusted to adapt the filter to any particular application; for example, to adapt an equalizer to the characteristics of a particular telephone line. Commonly the variable parameters are set by an iterative procedure to their initial values during a training mode prior to the actual transmission of data, during which a known training sequence is transmitted. One review of prior equalization art is Proakis and Miller, IEEE Trans. Inf. Theo. Vol. IT – 15, No. 4, 1969.

One training sequence which has been used consists of single isolated pulses sent at intervals long enough so that intersymbol interference totally dies away between pulses. Alternatively, extended pseudo-noise sequences have been used; these are periodic sequences which have correlation properties similar to those of single pulses, but have much more energy in a period. In either case, however, the time phase of the transmitted sequence must be estimated before training can start, in order to generate a properly phased replica of the transmitted sequence as a training sequence at the receiver. The principal virtue of the present invention is that it allows training to be successfully performed regardless of the phase of the training sequence, so that the necessity of acquiring phase is eliminated. Savings in training time and equipment complexity are consequently realized.

In general, the invention features a periodic training sequence with period exactly equal to the number of variable parameters of the filter to be set in the training mode. In preferred embodiments initially adjusted coefficients for the variable parameters are cycled to a preferred position.

Figure 1:
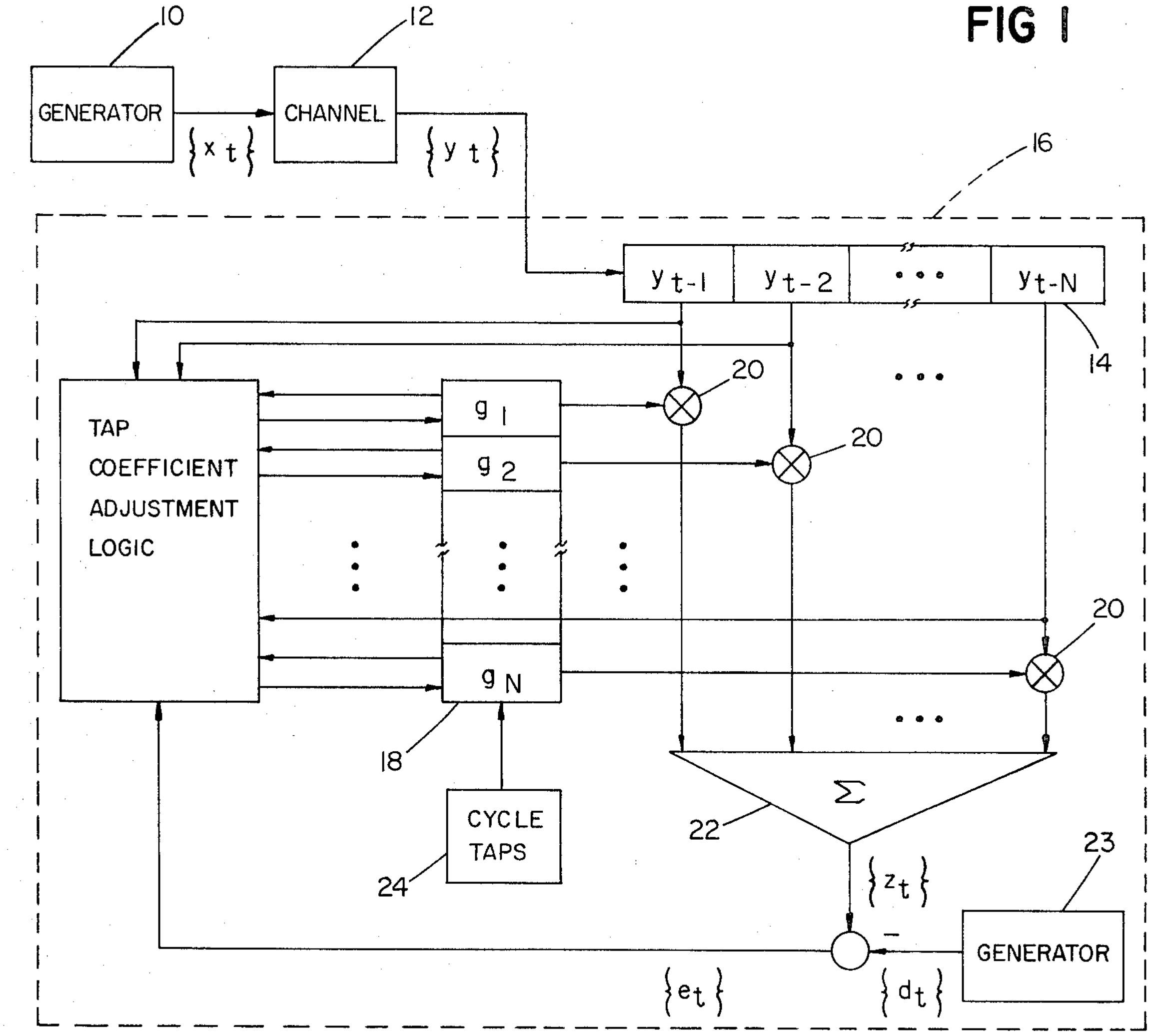
Figure 2:
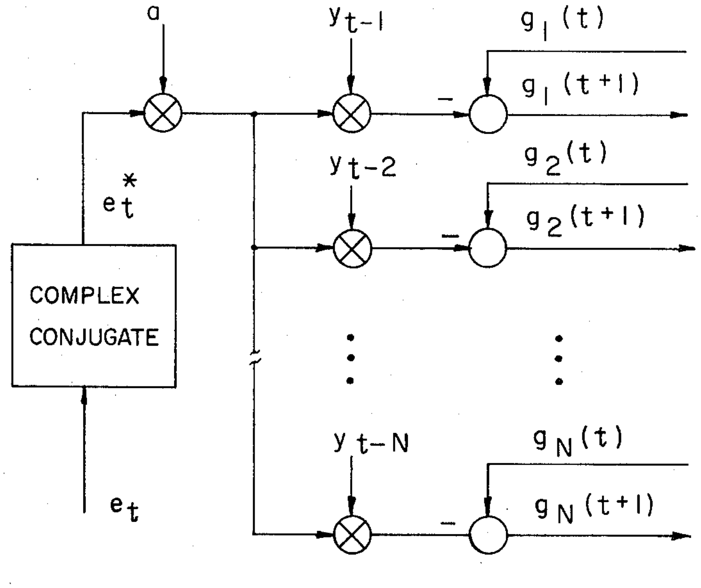

Other advantages and features of the invention will be apparent from the following description of a preferred embodiment thereof, taken together with the drawings in which:

FIG. 1 is a diagram of a communication system employing an adaptive linear filter; and FIG. 2 is a diagram of the tap coefficient adjustment logic of the system of FIG. 1.

Referring to FIG. 1, a sequence of inputs $x_0, x_1, \ldots, x_t, \ldots$ is provided by generator 10 at a rate of 1/T inputs per second. These inputs are entered into a physical system referred to as a channel 12, although the inputs need not be remote, and the system may be constructed of any elements whatever. At the output of the channel there is a sequence of signals $y_0, y_1, \ldots, y_t, \ldots$, again at rate 1/T signals per second, and representing either real or complex numbers. When the inputs are real or complex and the channel approximately linear, it can be characterized by an impulse response $h_0, h_1, \ldots$ such that the signals $y_t$ are given mathematically by $$y_t = \sum_{i=0}^{\infty} h_i x_{t-i} + n_t$$

where the $n_t$ are noise terms which are small relative to $y_t$.

The N most recent signals $y_{t-1}, y_{t-2}, \ldots, y_{t-N}$ are then stored in a serial memory 14, which forms part of adaptive filter 16. If the $y_t$ are in analog form, this would be a tapped delay line; or if they are digital, a shift register. There are also stored internally in the filter N tap coefficients $g_1, g_2, \ldots, g_N$; in the analog case, these might be stored as voltages across a capacitor, or in the digital case as binary-coded numbers in a storage register 18. Again the tap coefficients may be either real or complex numbers. During each unit of time of length T, the current contents of the serial memory are respectively multiplied at 20 by the tap coefficients, and the results summed at 22 to give the filter output $$z_t = \sum_{i=1}^{N} g_i y_{t-i}$$

This arithmetical operation can be performed by any of many standard techniques well-known in the art, again depending whether the numbers involved are real or complex, analog or digital, and so forth.

At the filter output, an error signal $e_t$ is formed by subtracting a desired output $d_t$ (provided by generator 23) from $z_t$:

$$e_t = z_t - d_t.$$

The desired output sequence $d_0, d_1, \ldots, d_t, \ldots$ is commonly equal to a time shift of the original input sequence $x_0, x_1, \ldots$, but need not necessarily be so; for example, it could be a filtered version of the input sequence, or a still more unrelated sequence.

Finally, the error signals $e_0, e_1 \ldots$ are used to adjust the tap coefficients $g_1, g_2, \ldots g_N$. There are many algorithms in use; the so-called LMS or steepest descent algorithm is used here for illustration. Let $g_i(t)$ stand for the value of tap coefficient $g_i$ at time t; then in each time unit all N tap coefficients are adjusted according to the equations $$g_i(t+1) = g_i(t) - a e_t^* y_{t-i}, 1 \leq i \leq N,$$

where $a$ is a small constant and $e_t^*$ is the complex conjugate of $e_t$ when $e_t$ is complex, or simply $e_t$ when $e_t$ is real. This algorithm is illustrated in FIG. 2. It is well-known that for sufficiently small $a$ this algorithm always converges to the set of tap coefficients which give on the average the least mean-squared error, regardless of the initial values of the tap coefficients.

The use of an input training sequence $x_t$ with period M=N, and a desired sequence $d_t$ of the same period, allows training to commence immediately without acquisition of phase, since phase is immaterial.

The proof of this fact is as follows. Assume that when the inputs $x_t$ have period N, the signals $y_t$ also have period N, except possibly for a small non-periodic noise component $n_t$; hence $$y_t = \hat{y}_t + n_t$$

where $\hat{y}_t = \hat{y}_{t-N}$ for all $t \geq N$. Also suppose that when the desired output sequence is properly phased, there is some set of tap coefficients $g_i$ to which the adaptive filter will set up, and which represent an acceptable initial set of values for the adaptive filter at the end of the training sequence. With this set of tap coefficients, the filter outputs $z_t$ are given by $$z_t = \hat{z}_t 30\ n'_t$$

where the periodic component is $$\hat{z}_t=\sum_{i=1}^{N} g_i\hat{y}_{t-i}$$

and the noise component is $$n'_t=\sum_{i=1}^{N} g_i n_{t-i}$$

Clearly, in order that the errors be small, it is necessary and sufficient that the periodic part of the output, $\hat{z}_t$, approximately equal the periodic desired output sequence $d_t$. (It can be shown that if $n_t=0$ and $\hat{y}_t$ is any periodic sequence with no nulls in its discrete spectrum, then the LMS algorithm will always set up the tap coefficients so that $\hat{z}_t=d_t$ for any desired sequence $d_t$.)

Now suppose that the output sequence provided by generator 23 $d'_t$ is actually an out of phase version of the desired output sequence $d_t$; in other words, $d'_t=d_{t-\tau}$ for some time shift $\tau$. Suppose further that the filter tap coefficients are also cyclically out of phase by $\tau$; that is, $$g'_i=\begin{matrix} g_{i-\tau}, \tau<i\leq N; \\ g_{N+i-\tau},\ 1\leq i\leq\tau \end{matrix}$$

Then the periodic part $\hat{z}_i$ of the filter output will be $$\begin{aligned}\hat{z}'_t&=\sum_{i=1}^{N} g'_i\hat{y}_{t-i}\\ &=\sum_{i=1}^{\tau} g_{N+i-\tau}\hat{y}_{t-i}+\sum_{i=\tau+1}^{N} g_{i-\tau}\hat{y}_{t-i}\\ &=\sum_{i'=N-\tau+1}^{N} g_{i'}\hat{y}_{t+N-\tau-i'}+\sum_{i'=1}^{N-\tau} g_{i'}\hat{y}_{t-\tau-i'}\\ &=\sum_{i'=N-\tau+1}^{N} g_{i'}\hat{y}_{t-\tau-i'}+\sum_{i'=1}^{N-\tau} g_{i'}\hat{y}_{t-\tau-i'}\\ &=\hat{z}_{t-\tau}\end{aligned}$$

where $i'=N+i-\tau$ for $1\leqslant i\leqslant\tau$, $i'=i-\tau$ for $\tau+1\leqslant i\leqslant N$, and $\hat{y}_{t+N-\tau-i'}=\hat{y}_{t-\tau-i'}$ since $\hat{y}_t$ has period $N$. Thus the periodic part of the output is the same as before except shifted by $\tau$, so that it will approximately equal the desired output shifted by $\tau$. Hence the filter will adapt to a shifted version of the desired output by producing tap coefficients which are in effect shifted by the same amount, for any of the commonly used algorithms including the LMS algorithm. The behavior of the filter during the training process will be exactly the same otherwise regardless of the value of $\tau$.

Once the filter has produced a set of properly adapted tap coefficients, it may be desirable to cycle them around to some preferred position before data transmission begins. For example, when the filter is being used to equalize a linear channel, the means for cycling is adapted to cyclically shift the tap coefficients in a closed loop until the large coefficients are near the center and the small coefficients near the end of the equalizer. Conventional means for accomplishing such cycling are indicated at 24. An alternative means for accomplishing such cycling would be to cycle the desired outputs $d_t$ and to retrain with the new set of desired outputs.

The benefits of this scheme are realized only when the period M of the input sequence and of the desired output sequence during training mode is exactly equal to the number of variable parameters N in the adaptive filter. If M>N, then for certain phases of the desired sequence, significant tap coefficients will fall "off the end" of the filter, i.e., the adaptive filter will not be able to generate outputs approximately equal to the desired output sequence, and the best tap coefficients will be significantly distorted from what they would be if the desired output sequence were properly phased. If M<N, then there are not enough "degrees of freedom" in the input sequence, and arbitrary factors may enter the tap coefficients. For example let $M=N-1$, and let $\{g_i\}$ be any set of tap coefficients; then any other set of tap coefficients $\{g'_i\}$ such that $g_1+g_N=g'_1+g'_N$ and $g_i=g'_i$, $2\leqslant i\leqslant N-1$, will give the same periodic component in the output sequence, since $$\begin{aligned}\hat{z}_t&=\sum_{i=1}^{N} g_i\hat{y}_{t-1}\\ &=(g_1+g_N)\hat{y}_{t-1}+\sum_{i=2}^{N-1} g_i\hat{y}_{t-i},\end{aligned}$$

where $\hat{y}_{t-1}=\hat{y}_{t-N}$ since $\{\hat{y}_t\}$ has period $M=N-1$. This indeterminacy can be avoided by holding N-M tap coefficients to zero, at the cost of initially setting up fewer tap coefficients in the training sequence, under the condition that the N coefficients being set up be consecutive or in general that no two coefficient positions being set up differ by an integer multiple of N.

Other embodiments are within the following claims.

I claim:

1. In a system including an adaptive transversal filter having a serial memory through which passes a succession of signals representing real or complex numbers, the output of said filter being the sum of the pairwise products of the signals in said filter with a set of adjustable tap coefficients, N said tap coefficients being adjustable during a training mode upon receipt of a training sequence of signals at the rate of 1/T signals/second, the adjustment being in accordance with a sequence of error values, said error values being equal to the difference between said outputs and a desired output sequence; that improvement comprising means for causing said training sequence and said desired output sequence both to be periodic with period N signalling intervals T.

2. The improvement of claim 1 further comprising means for cycling said tap coefficients to a preferred position after adjustment during said training mode.

3. The improvement of claim 2 wherein said means for cycling said coefficients is adapted to position the largest coefficient in the middle of the sequence of said coefficients.

4. In a method of training an adaptive transversal filter, having a serial memory through which passes a succession of signals representing real or complex numbers, the output of said filter being the sum of the pairwise products of the signals in said filter with a set of adjustable tap coefficients, N said tap coefficients being adjustable during a training mode upon receipt of a training sequence of signals at the rate of 1/T signals/second, the adjustment being in accordance with a sequence of error values, said error values being equal to the difference between said outputs and a desired output sequence; that improvement comprising causing said training sequence and said desired output sequence both to be periodic with period N signalling intervals T.

5. The improvement of claim 4 further comprising cycling said tap coefficients to a preferred position after adjustment during said training mode.

* * * * *

UNITED STATES PATENT OFFICE
CERTIFICATE OF CORRECTION

Patent No. 3,723,911 Dated March 27, 1973

Inventor(s) George D. Forney, Jr.

It is certified that error appears in the above-identified patent and that said Letters Patent are hereby corrected as shown below:

Col. 2, line 39, replace the superscript "=" with --*--.

Col. 2, line 41, replace the superscript "=" with --*--.

Col. 2, line 66, "$Z_t = \hat{Z}_t 30n'_t$" should read --$Z_t = \hat{Z}_t + n'_t$--.

Col. 3, line 24, "$\hat{Z}_i$" should be --$\hat{Z}'_t$-- as in line 26.

Col. 4, line 10, "$g_i = g \cdot_i$" should read --$g_i = g'_i$--.

Col. 4, line 12, "t-1" should read --t-i--.

Signed and sealed this 17th day of December 1974.

(SEAL)
Attest:

McCOY M. GIBSON JR.
Attesting Officer

C. MARSHALL DANN
Commissioner of Patents